(12) United States Patent
Amsler et al.

(10) Patent No.: US 8,771,587 B2
(45) Date of Patent: Jul. 8, 2014

(54) COPPER ANODE FURNACE AND A METHOD FOR OPERATING THE SAME

(75) Inventors: Heinrich Amsler, Greppen (CH); Kurt Ackermann, Ballwil (CH); Klaus Gamweger, Leoben (AT); Bernhard Handle, Vienna (AT)

(73) Assignee: Stopinc Aktiengesellschaft, Hunenberg (CH)

(*) Notice: Subject to any disclaimer, the term of this patent is extended or adjusted under 35 U.S.C. 154(b) by 524 days.

(21) Appl. No.: 13/061,579

(22) PCT Filed: Sep. 4, 2009

(86) PCT No.: PCT/EP2009/006448
§ 371 (c)(1),
(2), (4) Date: Jun. 7, 2011

(87) PCT Pub. No.: WO2010/025940
PCT Pub. Date: Mar. 11, 2010

(65) Prior Publication Data
US 2011/0226437 A1    Sep. 22, 2011

(30) Foreign Application Priority Data
Sep. 5, 2008  (CH) ....................................... 1422/08

(51) Int. Cl.
*B22D 23/00* (2006.01)

(52) U.S. Cl.
USPC .............................................. 266/236; 222/600

(58) Field of Classification Search
USPC .......................... 266/236, 217; 222/600, 603
See application file for complete search history.

(56) References Cited

U.S. PATENT DOCUMENTS

| 3,581,948 A * | 6/1971 | Detalle ......................... 222/603 |
| 3,765,572 A * | 10/1973 | Neumann et al. ............. 222/600 |
| 4,219,188 A * | 8/1980 | Meier ............................ 266/236 |
| 5,320,799 A * | 6/1994 | Goto et al. .................... 266/213 |

* cited by examiner

*Primary Examiner* — Scott Kastler
(74) *Attorney, Agent, or Firm* — Brian Roffe

(57) ABSTRACT

A copper anode furnace includes a furnace drum which can be pivoted about a horizontal axis and in which copper melt is refined into anode copper by fire refining. The furnace drum is provided with a spout for pouring out the refined copper. A sliding closure is arranged on the spout of the furnace drum. The sliding closure includes at least one stationary, fireproof closing plate and a fireproof sliding plate which can be displaced relative to the closing plate. Through the displacement of the sliding plate, the outflow out the furnace drum can be regulated or closed and therefore the outflow amount of the copper can be controlled. A drawing of slag into the casting, which reduces the anode quality, can be prevented using the sliding closure.

13 Claims, 1 Drawing Sheet

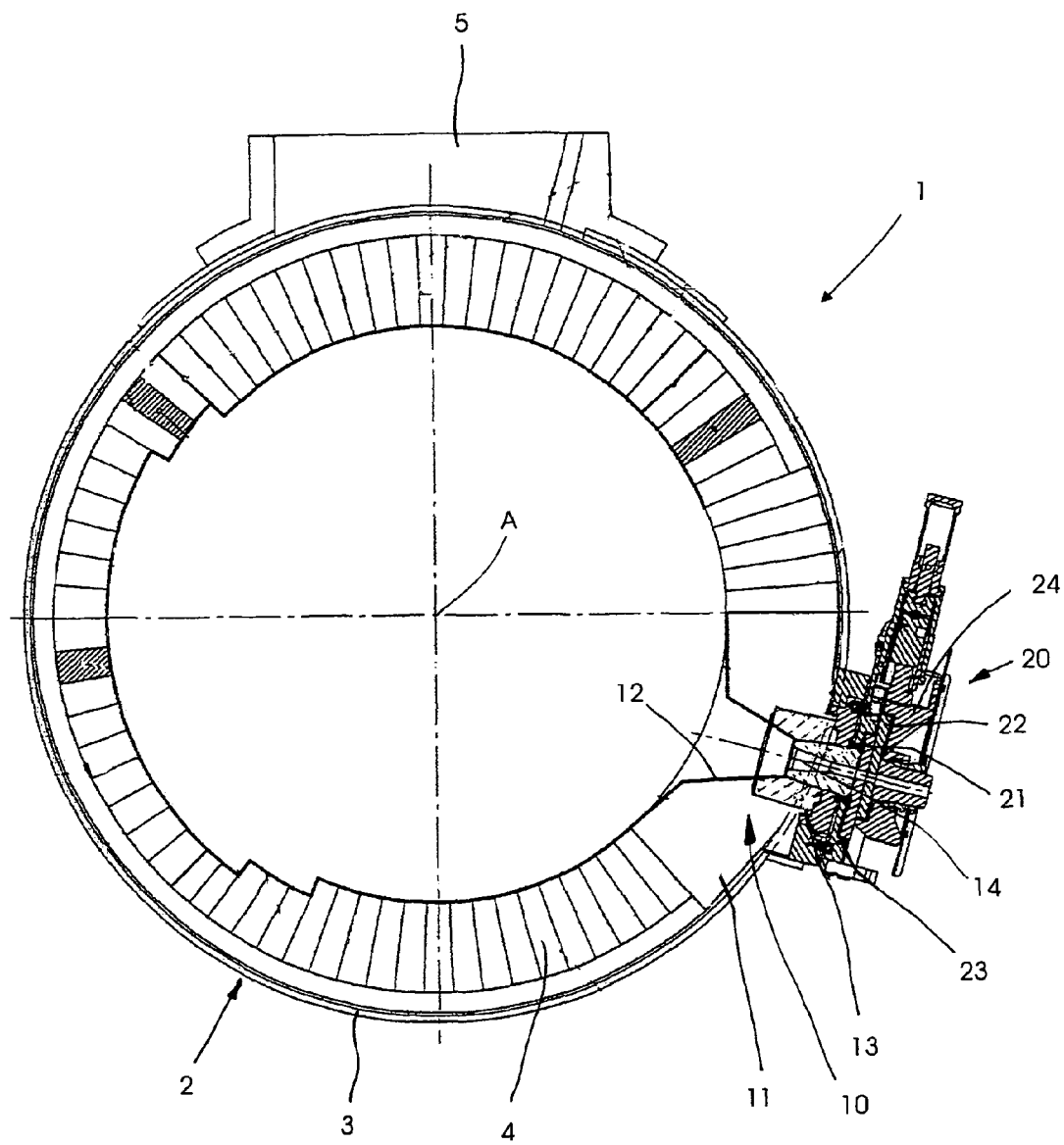

COPPER ANODE FURNACE AND A METHOD FOR OPERATING THE SAME

FIELD OF THE INVENTION

The invention relates to a copper anode furnace according to the preamble to Claim 1, and to a method for operating the same.

BACKGROUND OF THE INVENTION

Copper anode furnaces, in which copper melt is refined into anode copper by means of fire refining and then the copper is poured out in anode form, are known. The anodes are further processed by means of electrolysis. The quality of the anodes substantially affects the power consumption, i.e. the cost-effectiveness of the electrolysis.

The copper anode furnace is known to comprise a furnace drum which can be pivoted about a horizontal axis and in which the copper melt with 95-98% copper is brought in two stages to a purity level of approximately 99%, oxidation of the undesired accompanying elements (primarily the sulphur) taking place first of all, and then the oxygen content which has risen significantly due to the oxidation is reduced again in a reduction phase. The copper is poured out via a run-off hole disposed on the periphery of the furnace drum. When pouring out the furnace drum is turned bit by bit in order to regulate the casting speed and to take account of the falling molten bath level. A number of disadvantages arise from this. Due to the position of the run-off hole—very close to the surface of the bath—slag is also poured off, and this has a negative impact upon the anode quality. In addition, the fall height of the copper from the run-off into a channel system is very high, and so the oxygen which one had taken pains to remove is taken up again, and this also leads to worsening of the anode quality. Moreover, the environment is seriously contaminated by the sprayed copper, material losses also being observed.

OBJECTS AND SUMMARY OF THE INVENTION

The object forming the basis of the present invention is to provide a copper anode furnace of the type specified at the start which enables the efficient production of anodes with improved anode quality.

This object is achieved according to the invention by a copper anode furnace having a furnace drum that can be pivoted about a horizontal axis and in which copper melt is refined into anode copper by means of fire refining and which has a spout for pouring out the refined copper. A sliding closure is arranged on the spout of the furnace drum and comprises at least one stationary, fireproof closing plate and a fireproof sliding plate that can be displaced relative to the closing plate. By displacing the sliding plate, it is possible to regulate or close the outlet from the furnace drum, and therefore control the outflow amount of the copper.

Further preferred embodiments of the copper anode furnace according to the invention form the subject matter of the dependent claims.

With the copper anode furnace according to the invention the fall in hydrostatic pressure which accompanies the falling molten bath level is not taken into account by turning the furnace drum in order to regulate the flow speed of the copper, but rather the outflow quantity is controlled by means of a sliding closure arranged on the spout of the furnace drum. By pivoting the furnace drum out of a position lying above the molten bath in which it is located when treating the copper melt, the spout can be brought into a casting position in which it is advantageously located in a low position directly above channels for the pouring out of anodes and in which casting position it remains for the whole of the casting process. It is advantageous here that there is no risk of slag being drawn into the casting which would have a negative impact upon the anode quality.

Furthermore, the fall height of the copper from the spout into the channel system is small, and so there is no spraying of copper. In this way not only is the complexity of refining substantially reduced, but also substantially less copper losses are caused. The amount of copper saved no longer needs to be melted down again, and this also means a reduction in $CO_2$ emissions.

By means of the smaller fall height the undesired reuptake of the oxygen which one had previously taken pains to remove is also substantially reduced and in this way the anode quality is improved.

A further advantage of the copper anode furnace according to the invention provided with the sliding closure on the spout of the furnace drum is that in a dangerous situation an immediate emergency stop can be initiated.

BRIEF DESCRIPTION OF THE DRAWINGS

In the following the invention is described in greater detail by means of the drawing. The latter shows:

FIG. 1 is a vertical cross-section of an exemplary embodiment of a copper anode furnace according to the invention.

DETAILED DESCRIPTION OF THE INVENTION

FIG. 1 shows a copper anode furnace 1 which comprises a furnace drum 2 which can be pivoted about a horizontal axis A. The furnace drum 2 has a cylindrical steel coating 3 and a fireproof lining 4. Copper melt with 95-98% copper is poured into the furnace drum 2 via a filler opening 5, a maximum of 60% of the furnace drum volume being filled. The copper melt is refined in the furnace drum 2 by means of fire refining into anode copper with approximately 99% copper in a way known in its own right, and so not described in any greater detail. Oxidation of the undesired accompanying elements (primarily the sulphur) takes place here first of all, and then the oxygen content which has greatly increased due to the oxidation is reduced again in a reduction phase.

The furnace drum 2 is provided on its periphery with a spout 10 which serves to pour out the refined copper into a channel system not evident from the drawing. Located in the pouring out region of the fireproof lining 4 is a fireproof perforated brick 11 which has an outlet opening 12 and a fireproof case 13 adjoining the latter with an outlet opening 14. The outlet opening 12 of the perforated brick 11 is designed such that it tapers towards the case 13 and forms a corresponding feeding angle. The outlet opening 14 of the fireproof case 13 extends conically towards the perforated brick 11 and has at least one part extending conically towards the perforated brick 11.

According to the invention a sliding closure 20 is arranged on the spout 10 of the furnace drum 2 which comprises a stationary, fireproof closing plate 21 and a fireproof sliding plate 22 which can be displaced relative to the latter. The stationary, fireproof closing plate 21 is fastened within a housing 23 mounted on the furnace drum 2 and lies tight against the fireproof case 13. The fireproof sliding plate 22 is held in a sliding unit 24. By displacing the sliding unit 24 and the sliding plate 22 inserted into the latter the outlet formed by the outlet openings 12, 14 can be brought out of the furnace drum 2 out of the open position illustrated in FIG. 1 into a regulating or closed position.

Needless to say, instead of a sliding closure comprising just one stationary closing plate, one with two stationary closing plates and a sliding plate disposed displaceably between the latter could also be used.

The large feeding angle of the fireproof perforated brick 11 and the design of the fireproof case 13 (conical part of the outlet opening 14) contribute to the hottest possible copper being brought close to the sliding closure 20, by means of which the tendency of the copper to set in the casting channel when the sliding closure 20 is closed is reduced.

Such freezing of copper in the outlet can additionally be prevented by argon gas being blown into the outlet with the sliding closure 20 closed, preferably by means of a flush stopper with a gas connection provided in the sliding plate 22 (not shown).

When treating the copper melt the spout 10 provided with the sliding closure 20 is located in a position lying above the melt bath. For pouring out, by pivoting the furnace drum 2 it is brought into a casting position in which it is located in a low position directly above channels for pouring out anodes, and in which it remains for the whole casting process. The falling hydrostatic pressure accompanying the falling molten bath level is not taken into account by turning the furnace drum 2 in order to regulate the flow speed of the copper (casting speed), but rather the flow speed is controlled by means of the sliding closure 20 by displacing the sliding unit 24. This is associated with several substantial advantages.

Since the spout 10 is always in a low position, there is no risk of slag being drawn into the casting which would have a negative impact upon the anode quality.

Furthermore, the fall height of the copper from the spout 10 into the channel system is small, and so there is no spraying of the copper. In this way not only is the refining complexity substantially reduced, but also substantially less copper losses are caused. Therefore, for example, with a 120 t anode furnace 100-120 t more anodes could be poured out per month. The amount of copper saved no longer needs to be melted down again, and this also means a reduction in the $CO_2$ emissions.

By means of the smaller fall height the undesired reuptake of the oxygen which one had previously taken pains to remove is also substantially reduced, and in this way the anode quality is improved. It is also possible to totally seal off the oxygen in the air by means of a shrouding tube.

A further advantage of the copper anode furnace according to the invention provided with the sliding closure on the spout of the furnace drum is that in a dangerous situation an immediate emergency stop can be initiated.

The invention claimed is:

1. A copper anode furnace, comprising:
   a furnace drum which can be pivoted about an axis and in which copper melt is refined into anode copper, said furnace drum including a coating, a fireproof lining inward of said coating and a spout through which the refined copper is poured out of an interior of said furnace drum;
   a sliding closure arranged in connection with the spout, said sliding closure comprising at least one stationary, fireproof closing plate and a fireproof sliding plate displaceable relative to said at least one closing plate whereby displacement of said sliding plate enables regulation or closure of an outlet from said furnace drum and thereby control of an outflow amount of the copper from the interior of said furnace drum;
   a fireproof brick arranged in a pour-out region of said furnace drum, said fireproof brick including a seat on a side of said fireproof brick facing outward from said furnace drum and an aperture leading from said seat to a side of said fireproof brick facing the interior of said furnace drum; and
   a fireproof case arranged in said seat defined by said fireproof brick, said fireproof case being separate from said fireproof brick and including an aperture, said apertures of said fireproof brick and said fireproof case defining in combination an outlet opening between the interior of said furnace drum and said sliding closure,
   at least a portion of said aperture of said fireproof brick tapering from the side of said fireproof brick facing the interior of said furnace drum towards said seat in which said fireproof case is arranged and forming a feeding angle,
   at least a portion of said aperture of said fireproof case being conical with a larger cross-sectional area on a side more proximate the interior of said furnace drum.

2. The copper anode furnace of claim 1, wherein said aperture of said fireproof brick tapers conically towards said fireproof case.

3. The copper anode furnace of claim 1, wherein said aperture of said fireproof case tapers in its entirety conically towards said fireproof brick.

4. The copper anode furnace of claim 1, wherein said fireproof case includes a part that defines said at least a portion of said aperture that is conical.

5. The copper anode furnace of claim 1, wherein said furnace drum is configured to be pivotable about a horizontal axis.

6. The copper anode furnace of claim 1, wherein said furnace drum is configured to refine the copper melt into anode copper by means of fire refining.

7. The copper anode furnace of claim 1, wherein said sliding closure is arranged on said spout.

8. The copper anode furnace of claim 1, wherein said coating is a cylindrical steel coating and defines an outer surface of said furnace drum.

9. The copper anode furnace of claim 1, wherein said fireproof case adjoins said fireproof brick in the pour-out region.

10. The copper anode furnace of claim 1, wherein said furnace drum has a casting position in which said spout is situated in a low position oriented approximately perpendicularly downward.

11. The copper anode furnace of claim 1, wherein said fireproof brick is a perforated fireproof brick.

12. The copper anode furnace of claim 1, wherein said fireproof case is more proximate said sliding closure that said fireproof brick.

13. A method for operating the copper anode furnace of claim 1, comprising pivoting said furnace drum about its axis until said spout is in a position lying above a molten bath and maintaining said furnace drum in this position during a casting process.

* * * * *